United States Patent [19]

Roeing et al.

[11] 4,253,558
[45] Mar. 3, 1981

[54] CONVEYOR SYSTEM

[75] Inventors: Richard S. Roeing; Richard A. Defoe, both of Sterling, Ill.

[73] Assignee: Mallard Manufacturing Corporation, Sterling, Ill.

[21] Appl. No.: 895,970

[22] Filed: Apr. 13, 1978

[51] Int. Cl.³ .............................................. F16B 63/00
[52] U.S. Cl. .................................... 193/35 A; 74/782; 198/781
[58] Field of Search ............. 193/35 R, 35 A; 74/782; 188/90; 198/781

[56] References Cited

U.S. PATENT DOCUMENTS

| | | | |
|---|---|---|---|
| 1,900,150 | 3/1933 | Anderson | 193/35 A |
| 2,134,373 | 10/1938 | Parker | 193/35 A |
| 2,194,219 | 3/1940 | Eggleston | 193/35 A |
| 2,590,994 | 4/1952 | McKay | 193/35 A |
| 3,182,785 | 5/1965 | Tourtellette | 193/35 A |
| 3,789,960 | 2/1974 | Warren | 193/35 A |

FOREIGN PATENT DOCUMENTS 2232818   2/1973   Fed. Rep. of Germany ........... 198/781

*Primary Examiner*—Richard A. Bertsch
*Attorney, Agent, or Firm*—Carl C. Batz

[57] ABSTRACT

An automatic conveyor system for transporting articles from one place to another gently and without injury to any of them. A roller type conveyor is employed providing a track on top of the rollers with a braking arrangement which is normally in effect but which is intermittently and automatically relieved so that the articles move during relatively short periods and do not have a chance to build up momentum. Means are provided for relieving the braking action against the rollers and such means is automatically regulated by the putting on of articles at the beginning end of the conveyor and the taking off of articles at the terminal end of the conveyor.

14 Claims, 5 Drawing Figures

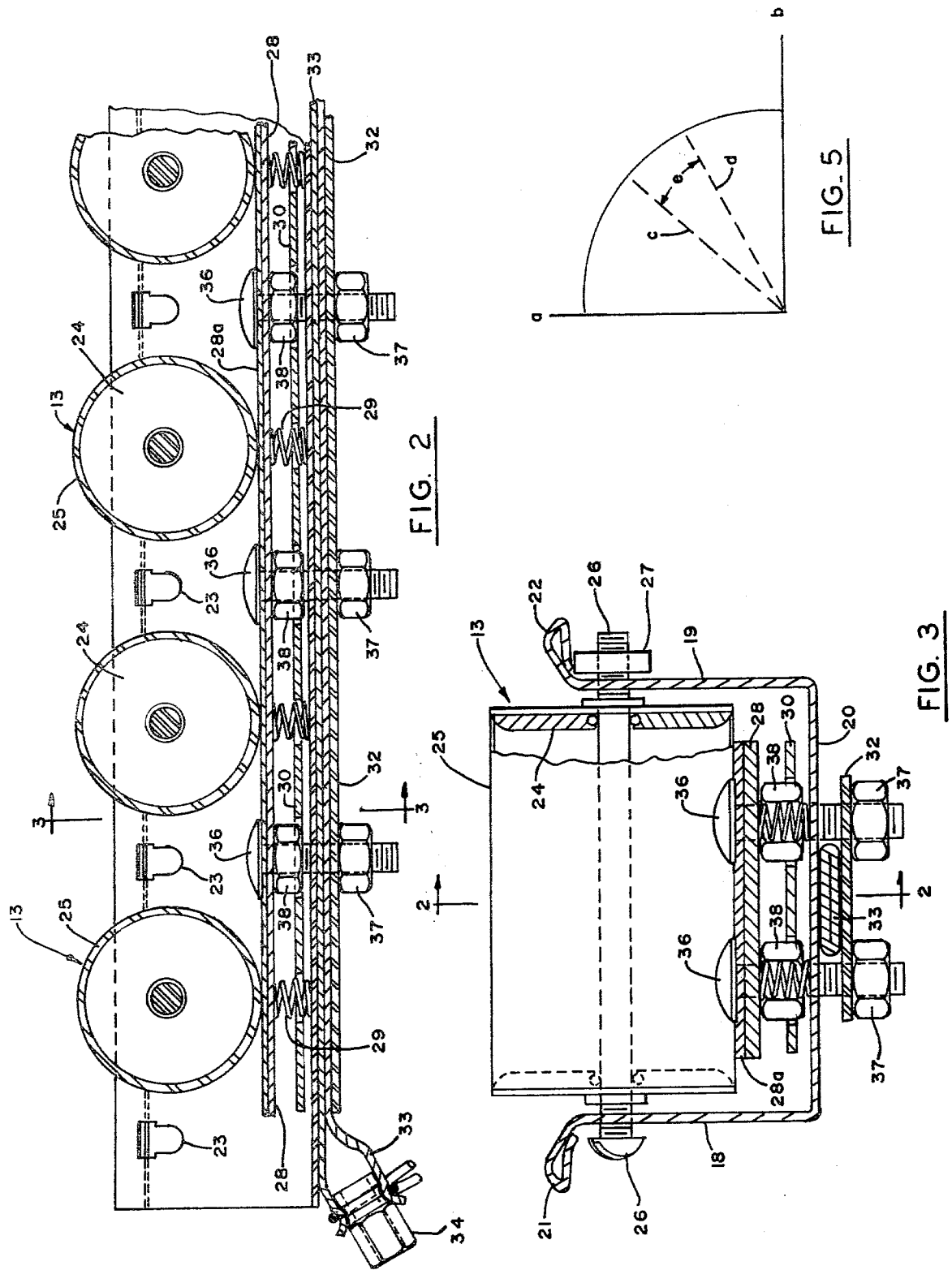

CONVEYOR SYSTEM

This invention relates to a conveyor system and more particularly to such a system in which rollers are lined up to provide an inclined track and the articles to be conveyed are permitted to move by gravity from an upper position to a lower position on the track.

BACKGROUND

Inclined roller conveyors have long been used to convey articles from one place to another in manufacturing plants and warehouses. Conveyors of this type have proved to be convenient and economical for moving articles, such as cartons, for short distances. However, there have been disadvantages and difficulties in their use. The cartons, or other articles, have to be stopped at the far end of the conveyor and the articles frequently become damaged as they reach the stop at the end of the conveyor or when they bump into other articles on the conveyor. This damage is especially heavy when some of the articles being conveyed are lighter than the others and the lighter articles are mixed with the heavier articles. When, for example, a lighter article reaches the stop at the end of the conveyor and is stationary against the end stop, and then a heavy article follows and bumps into the lighter article the lighter article may be damaged.

To take care of this difficulty, the practice has been to have a number of roller conveyor lines and to segregate the articles, sending the lighter articles down one conveyor line and sending the heavier articles down another conveyor line. Not only does this require more conveyor equipment, but the separation of the articles to be conveyed and the assembling of the articles again at the end of the conveyor is troublesome and inconvenient.

It would be of substantial benefit to have a roller type conveyor which passes the articles safely along its track to its terminal position, and of even greater benefit to have such a conveyor which could carry articles of varying weight, size and value, on the same conveyor without damage being done to any of them.

Accordingly, we have set about to provide a roller conveyor having such capabilities. Further, it is desired that the improved conveyor system work automatically with a minimum of attention by operating personnel. Other objects and advantages of the invention will be apparent from the following detailed description of the invention.

DISCLOSURE OF THE INVENTION

One embodiment of the invention is illustrated in the accompanying drawings in which FIG. 1 is a schematic side view of the improved conveyor with indication of the use of a fork lift at the ends of the conveyor;

FIG. 2 is a detailed broken sectional view taken along the center longitudinal section line shown as line 2—2 in FIG. 3;

FIG. 3 is an enlarged transverse sectional view taken along line 3—3 of FIG. 2;

FIG. 5 is a graph illustrating the operation of the line switches.

As illustrated, 10 designates a frame having upright standards 11. A number of standards 11 are provided in spaced arrangement on each side of the conveyor. Transverse frame members (not shown) extend transversely of the conveyor and on these transverse frame members are the longitudinal channels 12 in which the spaced rollers 13 are mounted.

Figure 1:
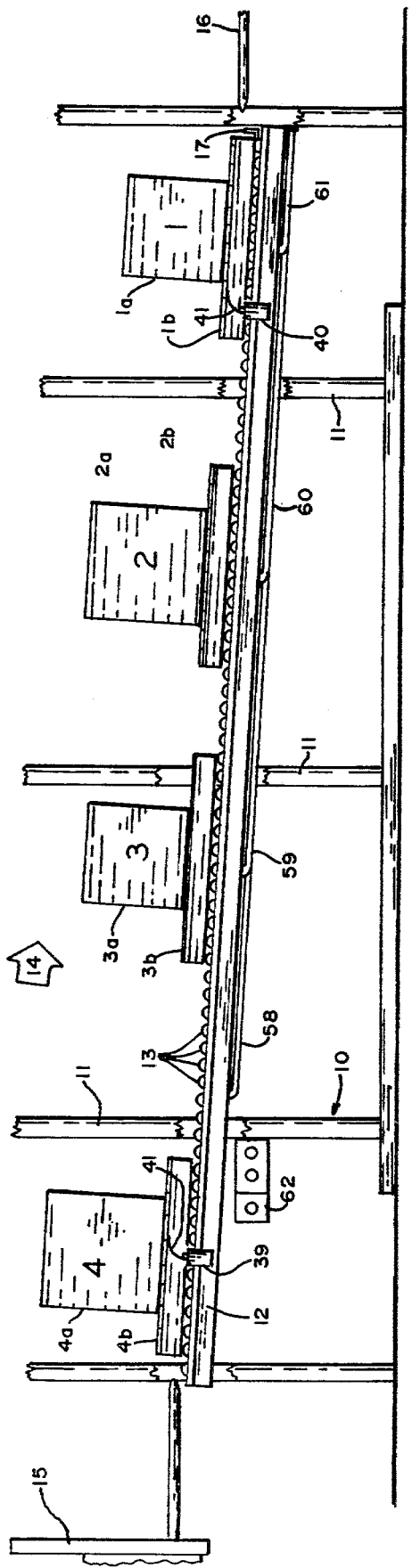

The channels are mounted in frame 10 in an inclined fashion. As illustrated in FIG. 1 the high or beginning end of the channel is at the left and the low or terminal end is at the right. The inclination of the channel may be at an angle of from about 10° to 25° with the horizontal, the inclination being determined such that the force of gravity will urge articles down the conveyor positively when the rollers are free. Although only one such channel provides an operative structure, we prefer that two or more channels be included in spaced arrangement.

In FIG. 1 a number of articles are shown. The article designated 1 includes a carton 1a on a pallet 1b, an article 2 composed of carton 2a on a pallet 2b, an article 3 composed of carton 3a on a pallet 3b, and an article 4 composed of a carton 4a on a pallet 4b. The cartons and pallets move along the conveyor path in the direction of arrow 14.

At the beginning end of the conveyor which is on the left side as indicated in FIG. 1, is shown the forklift 15. The forklift is a convenient tool for lifting the pallet with its carton thereon and placing it at the beginning position on the conveyor just as pallet 4b is shown in FIG. 1. At the terminal end of the conveyor is the stop 17 and forklift 16. Again, the forklift is a convenient tool for lifting the pallet with its carton thereon from the terminal position on the conveyor (as pallet 1a is shown in FIG. 1) and removing it from the conveyor.

The construction of channel 12 and the braking mechanism is illustrated more clearly in FIGS. 2 and 3. The channel 12 is of generally U-shaped cross section with sides 18 and 19 and bottom 20. The top portion of the sides are turned outwardly and at their top edges are turned inwardly to form the loops 21 and 22 as shown in FIG. 3. Each of sides 18 and 19 have the openings which are aligned with similar openings in the other side.

Each of rolls 13 has the cylindrical wall 25 and bearings 24. A bolt 26 extends through an opening 23 of side 18, through bearings 24 and through an opening 23 on side 19, and is secured by the nut 27. Thus, the roller rotates about the bolt 26. The tops of rolls 13 are in the same plane which serves as a track along which the articles may pass.

The braking mechanism includes the top plate 28 located just under the rolls 13. The top surface of this plate may be formed by a layer 28a of rubber or other braking material suitable for making contact with the bottom of rollers 13 to stop or slow the rotation of the rolls. Plate 28 is pressed upwardly against the bottom of rolls 13 by the spaced springs 29 which extend from the bottom 20 of the channel to the underside of plate 28. Another plate 30 extends between the top plate 28 and channel bottom 20 and has openings through which springs 29 extend.

Below bottom 20 and spaced therefrom is a bottom plate 32, and an airtube 33 made of rubber or other such flexible material. This tube where it extends between bottom plate 32 and bottom 20 of the channel, as shown in FIGS. 2 and 3, is in a relatively flat condition when air is exhausted from the tube. The tube is connected at its one end to the tube 34 which leads to the main valve 35 and at its other end is clamped shut.

Spaced bolts 36 each extend through openings in top plate 28, plate 30 and 32, and are secured by nuts 37. Intermediate nuts 38 are engaged with threads on bolts 36 and are adapted to pass through the openings in plate 30 and come against the bottom 20 of the channel to limit the downward movement of plates 28 and 32.

Figure 4:
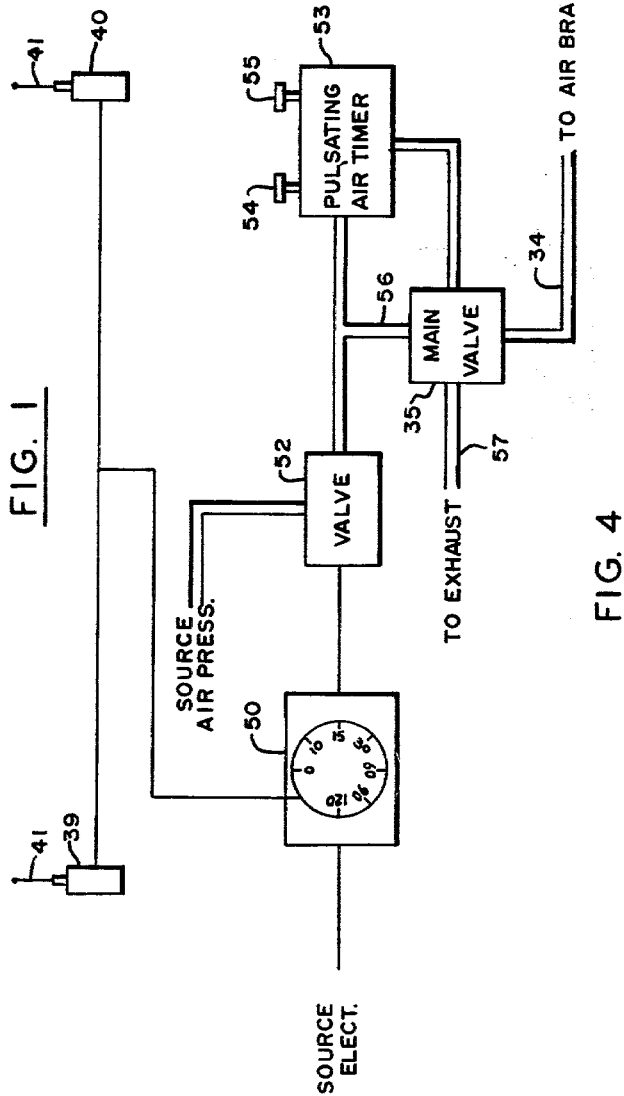
FIG. 4 is a schematic illustration of the electrical and compressed air circuitry.

Turning our attention to the electrical and air pressure circuitry shown in FIG. 4, we may note the line switches designated 39 and 40. Switch 39 is shown in FIG. 1 to be under the article 4 in the terminal position.

Each of switches 39 and 40 have an upwardly extending arm 41 (see FIG. 4) which is spring pressed to its upwardly extending position, but which when it is pressed forwardly will pivot about its base and throw the switch, closing a circuit as it moves about its pivot. Then when the arm is allowed to move back about its pivot under spring pressure, it again closes the circuit during its upward movement.

This is further illustrated in FIG. 5 where the line a indicates the normal direction of the arm and the line b indicates the direction of the arm when fully depressed. The dotted line c indicates the direction of the arm when during its downward movement the switch closes the circuit, and the dotted line d indicates the direction of the arm when the circuit is again opened. On its movement back to its normal position, the line d represents the direction of the arm when it closes the circuit and the line c represents the direction of the arm when the circuit is opened. The angle e represents the angle through which the arm moves when the circuit is closed.

Each of line switches 39 and 40 is connected with the timer 50.

Timer 50 is an electrical timer connected to a source of electrical potential. This timer is of the type such that when actuated, as by the closure of a circuit leading from either of switches 39 or 40 it will move to its zero time position and start running. Further, the intervals on this timer are set so that during a first period after the timer is set only the timer operates, and after this first period, which may be predetermined at, for example, 10 seconds, the timer closes a circuit which operates a solenoid driven valve 52.

Valve 52, when operated, opens an air circuit from a source of air pressure, through this valve, to the pulsating air timer 53. Timer 53 is a known device which is sensitive to air pressure at its inlet and operates to deliver pulses of air under pressure. It has two knobs 54 and 55, the knob 54 controlling the length of the pulses of air pressure, and knob 55 controlling the length of time between pulses.

The main valve 35 is normally in a position where it closes the air connection 56 and makes the air connection between the air brakes via tube 34 to the exhaust tube 57. However, when an air pressure pulse begins it operates to shift main valve 35 to connect air pressure through valve 52 and connections 56 and 34 to the tube 33.

Air pressure in tube 33 expands this tube to move bottom plate 32 downwardly, and through the connection of bolts 36 also to move the top plate downwardly against the tension of springs 29, thus reducing the pressure exerted by plate 28 against the rolls 13, or entirely removing this plate from contact with these rolls. When the nuts 38 strike channel bottom 20 this limits further expansion of tube 33 and lowering of plates 28 and 32.

When the pulsation of air pressure delivered by pulsating air timer 53 is finished, this allows the main valve 35 to come back to normal position in which it again closes off air pressure to this valve through connection 56 and opens tube 34 to exhaust.

These pulsations may continue until the timer 50 comes to the end of its cycle, which may be at a predetermined time after the start of the timer, for example, about 1½ minutes. At the end of its performance cycle, the timer 50 breaks the electrical connection to the valve 52 allowing this valve to cut off air pressure to the pulsating air timer 53.

The tube 34 leads from the main valve 35 to the brake mechanism of different sections of the track and serves to deliver intermittently compressed air to the brakes at different sections of the track. As here illustrated, the compressed air is delivered intermittently to each of the sections simultaneously, with the air to each section being controlled by the single pulsating air timer 53. In FIG. 1 four sections are shown, sections 58, 59, 60 and 61.

OPERATION

Let us assume that the conveyor system has been idle and the operator comes to put the system into operation.

First, he may connect the electrical power and see to it that the source of air pressure is open to valve 52. However, there are yet no articles on the conveyor track and no operation of the conveyor system is yet set in motion. The plate 28 is pressed by springs 29 against the underside of rollers 13 and the rolls are braked against rotation.

The operator may, by use of the forklift 15, raise article 1, which as here illustrated is carton 1a on the pallet 1b, and set it on the conveyor track at the beginning position. This moves arm 41 of switch 39 downwardly causing it to pass through angle e and while passing through this angle to cause timer 50 to move to zero time and begin to run.

For an initial period, the timer runs without starting anything, and during this period the article 1 moves freely on the conveyor track until it comes to the first brake section 58. During this period there is no air pressure on tubes 33 and the brakes are locked so that the number 1 article must stop when it begins to come over section 58.

It is understood that the timer 50 may be adjusted to change the length of the initial period, or to eliminate it by setting the timer so that the next event in the cycle begins at zero time. Ordinarily, we prefer that the initial period be from about 10 seconds to 15 seconds so as to allow an article which has been placed at the beginning position may move freely to the first braking section.

When 10 seconds, or whatever time the initial period of the timer was set for, have expired, the timer operates to shift valve 52 which operates to start the pulsating air timer, and this timer intermittently delivers air pressure to the main valve which intermittently permits air pressure to pass to the air brakes in pulses and to open the air from the brakes to exhaust between pulses. Since the brake tubes 33 are normally in flattened condition, the brakes are normally locked with the plate 28 firmly pressed against the rollers 13, and only when air pressure is being delivered to tubes 33 is the pressure relieved and braking action restrained or withdrawn. Accordingly, braking action is reduced or withdrawn only during the duration of the air pressure pulses, the articles on the conveyor track being permitted to move only during the period of the air pressure pulses and are braked between these periods.

This is a safety feature in that if the air pressure or the air connections should fail at any time, the brakes will hold rather than to permit the articles to move freely down the track.

With such braking system where articles are permitted to move freely down the track, much momentum is built up so that it takes a great force to stop the motion of the article and much damage may be done when the article is stopped. The damage may be to the moving article itself or to another article which it may strike. In this improved conveyor system where the movement of the article along the conveyor path is repeatedly interrupted, there is not the opportunity for great momentum to be developed and the danger of possible damage is greatly reduced.

When the number 1 article has advanced to a position where the arm 41 of switch 39 may move upwardly it traverses the angle e going upwardly and this operates, just as it did when the arm was being depressed, to reset timer 50 at time zero and start it running again. Then in another 10 seconds or whatever time the initial period was set at, the valve 52 is operated and the air pressure pulses start again. This interrupted movement of the article along the conveyor track may continue until the article reaches the terminal line switch 40 which resets the timer and starts the cycle again. When the article reaches the stop 17 it can go no farther whether or not the brakes be released.

When the timer reaches the end of the cycle, as it eventually will, the valve 52 shuts off the air pressure and the system becomes inactive. However, when the attendant uses the forklift 16 to remove the article at the terminal position, switch 40 moves to normal position and the cycle repeats once more and at the end of the cycle to pass completely along the track to the terminal position, so that no article will be left short of the terminal position.

It is to be understood that every time either of line switches 39 and 40 is operated in either direction, the cycle is again started.

When a following article 2 is placed at the beginning position on the conveyor the cycle starts again and the action is similar to that already described, and this article 2 then eases up against article 1 if at that time article 1 has not been removed from its terminal position.

Similarly, articles 3 and 4 may consecutively be placed at the beginning position on the conveyor track and they also will line up behind articles 1 and 2. As above explained, when any article is removed from the terminal end of the conveyor, the other articles on the conveyor will advance and one will take the place of the article which is removed until all articles have been removed at the terminal end of the conveyor.

If the article 1 should include, for example, a carton of light fixtures, while the article 2 includes a carton of hardware, it would be expected, according to past practices, that when the pallet bearing the hardware strikes the pallet bearing the light fixtures, the pallet bearing the light fixtures would be crushed, but using the system of the present invention the pallets move forward only for brief periods and during each of these there is no opportunity for the pallet bearing the heavy hardware to build up momentum, and this hardware pallet eases up to the pallet bearing the light fixtures without any damage to the goods on either pallet.

If it is found that the articles move too slowly down the conveyor track, the operator may adjust the pulsating air timer to lengthen the air pressure pulses and/or shorten the time between pulses, and if the articles move too fast, the operator may adjust the timer to lengthen the time between pulses and/or shorten the time of the pulses.

We find that in most situations it is desirable to have the pulsating air timer set to deliver pulses of air under pressure which range in length from 2 to 5 seconds with the periods between pulses being from 4 to 6 seconds in duration, but for special situations the periods of the pulses and between pulses may be adjusted to time values outside these ranges.

The individual units of the electrical and air pressure controls, including timer 50, line switches 39 and 40, valve 52, main valve 35 and pulsating air timer 53, are each known to the art and may be purchased individually from supply houses, but their combination and arrangement as herein described forms part of the invention herein set forth. If desired each of these units, except switches 39 and 40, may be housed in control panel 62 at the end of the conveyor.

In the foregoing description the switches 39 and 40 are mounted under the track and are operated automatically through contact with the pallet on the track over the switch. One of the switches could be mounted on the frame at a convenient location at one end of the conveyor, and if desired, the other of these switches may be similarly located at the other end of the conveyor. Then the operator after loading, or unloading, the conveyor may manually operate the switch to start the conveyor. In such case the conveyor continues its interrupted movement until the timer shuts off the system. In such case the switches 39 and 40 may be of the simple on-off or push button type.

While in the foregoing description we have described only certain specific embodiments of our invention, it will be apparent to those skilled in this art that many embodiments may be constructed and many changes may be made all within the spirit of the invention and the scope of the appended claims.

What we claim is:

1. A conveyor system comprising a channel having sides and a bottom, a plurality of cylindrical rolls extending transversely of said channel and axially mounted in said sides to provide a track at the top of said rolls along which articles may move, a top plate within said channel under said rolls, spring means for pressing said plate upwardly of said channel and against said rolls to thereby produce a braking action tending to restrict rotary movement of said rolls, and means for urging said plate downwardly counter to the pressure of said spring means to thereby reduce said braking action.

2. A conveyor system as set forth in claim 1 including a switch located at one end of said track, said switch being manually operable to start said articles in motion along said track.

3. A conveyor system as set forth in claim 1 in which said last mentioned means is effective to separate said top plate from said rolls to thereby completely remove the said braking action.

4. A conveyor system as set forth in claim 3 which includes a flexible tube which tube is connected to a source, and in which said last mentioned means is sensitive to the expansion of said tube upon increase of said air pressure.

5. A conveyor system as set forth in claim 4 which includes a bottom plate which plate extends below said bottom of said channel, and attachment means for attaching said bottom plate to said top plate, and in which said tube extends between said bottom plate and said bottom of the channel, whereby expansion of said tube operates to lower said top plate with respect to said channel and so relieve said braking action.

6. A conveyor system as set forth in claim 1 which includes a source of air pressure and in which said last mentioned means is actuated by an increase in said air pressure.

7. A conveyor system as set forth in claim 6 in which a source of air pressure is a source of pulsating air pressure.

8. A conveyor system as set forth in claim 7 including means for adjusting the length of said pulses.

9. A conveyor system as set forth in claim 7 in which said last mentioned means is sensitive to said pulsating air pressure and effective to urge said top plate downwardly during pulses of said air pressure to relieve said braking action.

10. A conveyor system as set forth in claim 9 in which said last mentioned means is sensitive to intervals between said pulses to produce said braking action.

11. A conveyor system as set forth in claim 10 inclusing means for adjusting the length of said intervals.

12. A conveyor system comprising a track along which articles may move from a beginning position to a terminal position, braking means for restricting the passage of articles along a section of said track, control means including a switch under said track for relieving said braking means after said article has passed over said switch, said control means being effective to intermittently relieve said braking means, a source of air pressure to which said control means is sensitive, means for delivering said air under pressure intermittently to said control means, said last mentioned means including a pulsating air timer connected witn said air pressure source, said timer being capable of delivering air under pressure intermittently to said control means, and a valve for controlling flow of air under pressure from said pulsating air timer to said control means and from said control means to exhaust the air, said valve being sensitive to the beginning of an air pulsation of said pulsating timer for connecting said source to said control means and sensitive to the end of the pulsation for shutting said connection with said source and for opening said control means to exhaust to the atmosphere air from said control means.

13. A conveyor system as set forth in claim 12 in which said pulsating air timer has means for adjusting the length of time of said pulsations, and means for adjusting the time between pulsations.

14. A conveyor system comprising a track along which articles may move from a beginning position to a terminal position, braking means for restricting the passage of articles along a section of said track, a source of air under pressure, a pulsating air timer connected to said source, a line switch having an upwardly extending arm which is depressed when an article on said track passes thereover, means sensitive to the position of said switch for opening said connection between said source and said air timer to relieve braking action when said arm is depressed, and means for closing said connection between said source and said pulsating air timer at the end of a predetermined interval after said connection is closed.

* * * * *